United States Patent
Herzig et al.

(10) Patent No.: US 7,319,120 B2
(45) Date of Patent: Jan. 15, 2008

(54) HYDROPHILIC COPOLYSILOXANES AND METHOD FOR THE PRODUCTION THEREOF

(75) Inventors: Christian Herzig, Waging (DE); Siegfried Dormeier, Stubenberg (DE)

(73) Assignee: Wacker Chemie AG, Munich (DE)

( * ) Notice: Subject to any disclaimer, the term of this patent is extended or adjusted under 35 U.S.C. 154(b) by 237 days.

(21) Appl. No.: 10/539,331

(22) PCT Filed: Dec. 18, 2003

(86) PCT No.: PCT/EP03/14494

§ 371 (c)(1), (2), (4) Date: Jun. 15, 2005

(87) PCT Pub. No.: WO2004/056907

PCT Pub. Date: Jul. 8, 2004

(65) Prior Publication Data

US 2006/0155051 A1    Jul. 13, 2006

(30) Foreign Application Priority Data

Dec. 19, 2002 (DE) ............... 102 59 612
Sep. 18, 2003 (DE) ............... 103 43 203

(51) Int. Cl.
*C08G 77/42* (2006.01)
(52) U.S. Cl. ............ 525/25; 31/28; 31/44; 31/76; 31/85
(58) Field of Classification Search ............ None
See application file for complete search history.

(56) References Cited

U.S. PATENT DOCUMENTS

| 3,775,452 | A | 11/1973 | Karstedt |
| 5,011,210 | A | 4/1991 | Inoue |
| 5,229,454 | A * | 7/1993 | Weichmann ............ 524/714 |
| 5,543,171 | A | 8/1996 | Shores |
| 2003/0032726 | A1 | 2/2003 | Shores |
| 2003/0032751 | A1 | 2/2003 | Shores |
| 2006/0247403 | A1 * | 11/2006 | Nguyen-Kim et al. ........ 528/10 |

FOREIGN PATENT DOCUMENTS

| EP | 1 178 069 | 2/2002 |
| WO | WO 02/10256 | 2/2002 |
| WO | WO 02/10259 | 2/2002 |
| WO | WO 02/10527 | 2/2002 |
| WO | WO 02/088209 | 11/2002 |
| WO | WO 03/078504 | 9/2003 |
| WO | WO 03/095735 | 11/2003 |
| WO | WO 2004/055088 | * 7/2004 |
| WO | WO 2004/056907 A2 | 7/2004 |

OTHER PUBLICATIONS

U.S. Appl. No. 11/139,900, filed May 27, 2005, Ochs et al.
Chemical Abstracts 136: 38808, "Softening Agent Compositions Containing Polyoxyalkylene Polysiloxanes for Fabrics".
English Derwent Abstract AN 2002-393539 [42] corresp. to WO 02/10259 A1.
English Derwent Abstract AN 2003-833472 [92] corresp. to WO 03/078504 A1.
English Derwent Abstract AN 2004-034694 [03] corresp. to WO 03/095735 A2.
English Derwent Abstract AN 2002-382419 [41] corresp. to Wo 02/10256 A1.
English Derwent Abstract AN 2003-058822 [05] corresp. to WO 02/088209 A2.
English Derwent Abstract AN 2002-382420 [41] corresp. to WO 02/10527 A1.
English Derwent Abstract AN 1965-37551 corres. to FR 137 0886 A.
Derwent CPI, 1988, Ref. 88-191752/28, corres. to EP 274 103 A.
Derwent CPI, 1993, Ref. 93-080454/10, corres. to JP-05-025239 A.
Derwent CPI, 1984, Ref. 84-077081/13, corres. to EP 103367 A.
Derwent CPI, 1986, Fef. 86-016498/03, corres. to JP-60-238315.

* cited by examiner

*Primary Examiner*—Marc S. Zimmer
(74) *Attorney, Agent, or Firm*—Brooks Kushman PC.

(57) ABSTRACT

Easily emulsified hydrophilic copolysiloxanes may be prepared by hydrosilylation employing an Si—H-functional organosiloxane with a compound containing both a hydrosilylatable group and an active hydrogen, and reacting the intermediate thus formed with a di- or polyisocyanate, wherein the reactants employed to produce the intermediate contain less than 2000 ppm water.

15 Claims, No Drawings

HYDROPHILIC COPOLYSILOXANES AND METHOD FOR THE PRODUCTION THEREOF

CROSS-REFERENCE TO RELATED APPLICATION

This application claims priority to PCT Appln. No. PCT/EP2003/014494 filed Dec. 18, 2003, and to German application 103 43 203.5 filed Sep. 18, 2003.

BACKGROUND OF THE INVENTION

1. Field of the Invention

This invention relates to hydrophilic siloxane copolymers and to a process for preparing them.

2. Description of the Related Art

U.S. Pat. No. 5,001,210 describes a method of producing polyurethanes wherein telechelic amino-functional siloxanes, after reaction with cyclic carbonates, are converted with di- or polyisocyanates into the target products. Polyethers are used in the form of diamino polyethers, which are costly compared with polyether diols and monools.

EP-A 1 178 069 describes the preparation of polyether urethane intermediates by reaction of alkenyl polyethers with diisocyanates and addition thereonto of silanes bearing hydrolysis-sensitive groups. Siloxane chain polymers are not obtainable in this way.

Branched polyether siloxanes are known from Chemical Abstracts 136: 38808. Hydrogensiloxanes are simultaneously reacted with divinylsiloxanes and allyl polyethers. Excess polyether remains unreacted in the product mixture. The products are used as textile softeners and are free of urethane and urea groups.

US 2003/0032726 and its equivalent WO 02/088209 (A. Andrew Shores) describe a reaction product of (A) polyisocyanate, (B) silicone having a dimethyl polysiloxane segment and one or more isocyanate-reactive groups, (C) reactant having one or more isocyanate-reactive groups and one or more ionizable groups, and (D) optionally an organic substance having one or more isocyanate-reactive groups but no ionizable groups, and (E) compound providing the counterion for said ionizable groups, wherein either the silicone (B) or the reactant (C), or both, have a single isocyanate-reactive group.

US 2003/0032751 (A. Andrew Shores) describes a reaction product of (A) polyisocyanate, (B) silicone having a dimethyl polysiloxane segment and one or more isocyanate-reactive groups, (C) reactant having one or more isocyanate-reactive groups and one or more ionizable groups, and (D) optionally an organic substance having one or more isocyanate-reactive groups but no ionizable groups, and (E) compound providing the counterion for said ionizable groups, wherein the average molecular weight of the reaction product is in the range from 600 to 20,000.

SUMMARY OF THE INVENTION

An object of the present invention is to provide hydrophilic siloxane copolymers in which the hydrophilic segments or blocks are interrupted by organic groups which act as donors or acceptors in the formation of hydrogen bonds. A further object of the present invention is to provide hydrophilic siloxane copolymers which are preparable in a simple process, which are easy to disperse in water and are in particular self-dispersing, i.e. form an emulsion, especially a microemulsion, without use of emulsifiers. These and other objects are achieved by the invention.

DETAILED DESCRIPTION OF THE PREFERRED EMBODIMENT(S)

The invention accordingly provides hydrophilic siloxane copolymers preparable by reacting, in a first step, organopolysiloxanes (1) which have at least one silicon-bonded hydrogen atom and preferably two or more silicon-bonded hydrogen atoms per molecule, with substantially linear oligomeric or polymeric compounds (2) of the general formula

$$R^1\text{-}(A\text{-}C_nH_{2n})_m\text{-}A^1\text{-}H \qquad (I)$$

where $R^1$ is a monovalent optionally substituted hydrocarbyl radical capable of adding Si—H groups in a hydrosilylation reaction, preferably a hydrocarbyl radical having an aliphatic carbon-carbon multiple bond, A is a bivalent polar organic radical selected from the group consisting of —O—, —C(O)—O—, —O—C(O)—, —O—C(O)—O—, —C(O)—NH—, —NH—C(O)—, urethane radical and urea radical, preferably an oxygen atom —O—, $A^1$ is a bivalent polar organic radical selected from the group consisting of —O—, —NH— and —NR'— (where R' is a monovalent hydrocarbyl radical of 1 to 18 carbon atoms), preferably an oxygen atom —O—, n is an integer from 1 to 20, preferably from 1 to 4 and more preferably from 2 or 3, and m is a positive integer, preferably from 5 to 50; and reacting, in a second step the resulting H-$A^1$-containing intermediates (4) with organic compounds (5), which have two or more isocyanate groups per molecule, with the proviso that the water content of the compounds (1) and (2), which are used for preparing the hydrophilic siloxane copolymers, is lower than 2000 weight ppm, preferably less than 1500 weight ppm and more preferably less than 1000 weight ppm in each case based on the total weight of compounds (1) and (2).

The water content is based on room temperature (20° C.) and the pressure of the ambient atmosphere (1020 hPa). The siloxane copolymers of the present invention preferably have a viscosity of 1000 to 100,000,000 mPa·s at 25° C., and more preferably 10,000 to 10,000,000 mPa·s at 25° C.

The present invention further provides a process for preparing hydrophilic siloxane copolymers by reacting, in a first step, organopolysiloxanes (1) which have at least one silicon-bonded hydrogen atom and preferably two or more silicon-bonded hydrogen atoms per molecule, with substantially linear oligomeric or polymeric compounds (2) of the general formula

$$R^1\text{-}(A\text{-}C_nH_{2n})_m\text{-}A^1\text{-}H \qquad (I)$$

where $R^1$ is a monovalent optionally substituted hydrocarbyl radical capable of adding Si—H groups in a hydrosilylation reaction, preferably a hydrocarbyl radical having an aliphatic carbon-carbon multiple bond, A is a bivalent polar organic radical selected from the group consisting of —O—, —C(O)—O—, —O—C(O)—, —O—C(O)—O—, —C(O)—NH—, —NH—C(O)—, urethane radical and urea radical, preferably an oxygen atom —O—, $A^1$ is a bivalent polar organic radical selected from the group consisting of —O—, —NH— and —$NR^2$— (where $R^2$ is a monovalent hydrocarbyl radical of 1 to 18 carbon atoms), preferably an oxygen atom —O—, n is an integer from 1 to 20, preferably from 1 to 4 and more preferably from 2 or 3 and m is a positive integer, preferably from 5 to 50 and reacting, in a second step, the resulting $H-A^1$-containing intermediates (4) with organic compounds (5), which have two or more isocyanate groups per molecule, with the proviso that the water content of the compounds (1) and (2), which are used for preparing the hydrophilic siloxane copolymers, is lower than 2000 weight ppm, preferably less than 1500 weight ppm and more preferably less than 1000 weight ppm in each case based on the total weight of compounds (1) and (2).

The first step of the process preferably utilizes linear, cyclic or branched organopolysiloxanes (1) constructed of units of the general formula

(II)

where

R in each occurrence may be the same or different and is a monovalent optionally substituted hydrocarbyl radical having 1 to 18 carbon atoms per radical, e is 0, 1, 2 or 3, f is 0, 1 or 2, and the sum total of e+f is 0, 1, 2 or 3, with the proviso that each molecule has at least one silicon-bonded hydrogen atom and preferably 2 or more silicon-bonded hydrogen atoms.

Preferred organopolysiloxanes (1) have the general formula

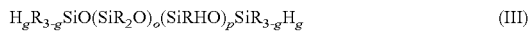
(III)

where R is as defined above, g is 0, 1 or 2, o is 0 or an integer from 1 to 1500, and p is 0 or an integer from 1 to 200, with the proviso that each molecule has at least one silicon-bonded hydrogen atom and preferably two or more silicon-bonded hydrogen atoms.

Formula (III) of this invention is to be understood as meaning that the o units of —($SiR_2O$)— and the p units of —(SiRHO)— may form any desired distribution in the organopolysiloxane molecule.

It is particularly preferable for g in the formula (III) to be 1, for p in the formula (III) to be 0 and for α,ω-dihydrogenpolydiorganosiloxanes and especially α,ω-dihydrogenpolydiorganoloxanes to be used as organopolysiloxanes (1).

The organopolysiloxanes (1) preferably have an average viscosity of 10 to 1000 mPa·s at 25° C., preferably 50 to 1000 mPa·s at 25° C. and more preferably 60 to 600 mPa·s at 25° C.

Examples of R radicals are alkyl radicals, such as methyl, ethyl, n-propyl, isopropyl, 1-n-butyl, 2-n-butyl, isobutyl, tert-butyl, n-pentyl, isopentyl, neopentyl, tert-pentyl, hexyl radicals, such as n-hexyl, heptyl radicals, such as n-heptyl, octyl radicals, such as n-octyl and isooctyl radicals, such as 2,2,4-trimethylpentyl, nonyl radicals, such as n-nonyl, decyl radicals, such as n-decyl, dodecyl radicals, such as n-dodecyl, and octadecyl radicals, such as n-octadecyl; cycloalkyl radicals, such as cyclopentyl, cyclohexyl, cycloheptyl and methylcyclohexyl; aryl radicals, such as phenyl, naphthyl, anthryl and phenanthryl; alkaryl radicals, such as o-, m-, p-tolyl radicals, xylyl radicals and ethylphenyl radicals; and aralkyl radicals, such as benzyl, α-phenylethyl and β-phenylethyl.

Examples of substituted R radicals are haloalkyl radicals, such as 3,3,3-trifluoro-n-propyl, 2,2,2,2',2',2'-hexafluoroisopropyl, heptafluoroisopropyl and haloaryl radicals, such as o-, m- and p-chlorophenyl.

The R radical is preferably a monovalent hydrocarbyl radical of 1 to 6 carbon atoms, methyl being particularly preferred.

Examples of R radicals fully apply to R' radicals.

$R^1$ is preferably a monovalent hydrocarbyl radical possessing an aliphatic carbon-carbon multiple bond.

Examples of $R^1$ radicals are alkenyl radicals, such as vinyl, 5-hexenyl, cyclohexenyl, 1-propenyl, allyl, 3-butenyl and 4-pentenyl, and alkynyl radicals, such as ethynyl, propargyl and 1-propynyl.

The $R^1$ radical is preferably an alkenyl radical, especially ω-alkenyl, and allyl is particularly preferred.

Preference for use as oligomeric or polymeric compounds (2) is given to polyethers of the general formula

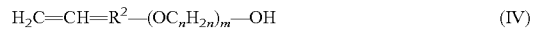
(IV)

where $R^2$ is a bivalent hydrocarbyl radical of 1 to 10 carbon atoms, preferably a radical of the formula —$CH_2$—, —CH($CH_3$)— or —C($CH_3$)$_2$— and n and m are each as defined above.

Preferred examples of polyethers (2) are those of the general formula

(IV')

where $R^2$ is as defined above and a and b is 0 or an integer from 1 to 200, with the proviso that the sum total of a+b is not less than 1 and preferably from 5 to 50.

Further examples of oligomeric or polymeric compounds (2) are unsaturated polyesters, such as $H_2C$=CH—$R^2$—[O(O)CC$_n$H$_{2n}$]$_m$—OH, unsaturated polycarbonates, such as $H_2C$=CH—$R^2$—[OC(O)OC$_n$H$_{2n}$]$_m$—OH, and unsaturated polyamides, such as $H_2C$=CH—$R^2$—[NHC(O)C$_n$H$_{2n}$]$_m$—NH$_2$, where $R^2$, n and m are each as defined above.

The amounts in which the compounds (2) are used in the first step are preferably in the range from 1.0 to 4.0 and preferably from 1.3 to 2.5 mol of $R^1$ radical, which is preferably a radical having an aliphatic carbon-carbon multiple bond and preferably is an ω-alkenyl radical, per gram atom of silicon-bonded hydrogen in organopolysiloxane (1).

The first step preferably utilizes catalysts (3) to promote the addition of silicon-bonded hydrogen onto aliphatic unsaturation. Useful catalysts (3) for the process of the present invention include the same catalysts as hitherto used to promote the addition of silicon-bonded hydrogen onto aliphatic unsaturation. The catalysts are preferably a metal from the group of the platinum metals or a compound or complex from the group of the platinum metals.

Examples of such catalysts are metallic and finely divided platinum, which may be on supports, such as silicon dioxide, aluminum oxide or activated carbon, compounds or complexes of platinum, such as platinum halides, examples being $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, such as platinum-1,3-divinyl-1,1,3,3-tetramethyldisiloxane complexes with or without detectable inorganically bound halogen, bis (gamma-picoline)platinum dichloride, trimethylenedipyridineplatinum dichloride, dicyclopentadieneplatinum dichloride, dimethylsulfoxideethyleneplatinum(II) dichloride, cyclooctadieneplatinum dichloride, norbornadieneplatinum dichloride, gamma-picolineplatinum dichloride, cyclopentadieneplatinum dichloride, and also reaction products of platinum tetrachloride with olefin and primary amine or secondary amine or primary and secondary amine, such as the reaction product of platinumtetrachloride dissolved in 1-octene with secbutylamine or ammonium-platinum complexes.

The amount in which catalyst (3) is used in the first step is preferably in the range from 1 to 50 weight ppm (parts by weight per million parts by weight) and more preferably in amounts of 2 to 20 weight ppm, all reckoned as elemental platinum and based on the total weight of organopolysiloxanes (1) and compounds (2).

The first step of the process is preferably carried out at the pressure of the ambient atmosphere i.e., at approximately 1020 hPa absolute, but can also be carried out at higher or lower pressures. Furthermore, the first step of the process is preferably carried out at a temperature in the range from 60° C. to 140° C. and more preferably at a temperature in the range from 80° C. to 120° C.

The second step of the process preferably utilizes organic compounds (5), which have two or more isocyanate groups per molecule, that have the general formula

O=C=N—R³—N=C=O  (V)

where R³ is a bivalent hydrocarbyl radical having 4 to 40 carbon atoms per radical.

Examples of organic compounds (5) are hexamethylene 1,6-diisocyanate, isophorone diisocyanate, tolylene 2,4-diisocyanate, tolylene 2,6-diisocyanate, phenylene 1,3-diisocyanate, 4,4'-methylenebis(cyclohexyl isocyanate), 4,4'-methylenebis(phenyl isocyanate) and dimethylphenyl diisocyanate.

The amounts in which organic compounds (5) are used in the second step are preferably in the range from 0.5 to 1.0 mol and more preferably in the range from 0.8 to 1.0 mol of isocyanate group per mole of H-A¹ group in the intermediate (4).

US 2003/0032726 and US 2003/0032751, both previously cited at the beginning, have polyisocyanate always being used in distinct excess, in contrast to the process of the present invention. In fact, there is active counseling in the two US references against the use of smaller quantities since they increase the viscosity of the product, making it difficult to handle and necessitating a solvent. There is consequently a distinct prejudice against the present invention's use of polyisocyanate (5) in a deficiency of 0.5 to 1.0 mol.

The reaction in the second step of the process according to the present invention preferably utilizes condensation catalysts (6), such as di-n-butyltin dilaurate, tin(II) octoate, dibutyltin diacetate, potassium octoate or tertiary amines, such as dimethylcyclohexylamine, dimethylaminopropyl- dipropanolamine, pentamethyldipropylenetriamine, N-methyl-imidazole or N-ethylmorpholine.

A preferred siloxane copolymer is obtained by a first step of reacting an α,ω-dihydropolydiorganosiloxane (1) in excess with a polyether (2) of the formula (IV) and a second step of reacting the intermediate (4), an HO-polyether-polysiloxane-polyether-OH, with a diisocyanate (5) of the formula (V) to introduce urethane groups into the siloxane copolymer. In the process, free polyether from the 1st step is also bound by urethane formation:

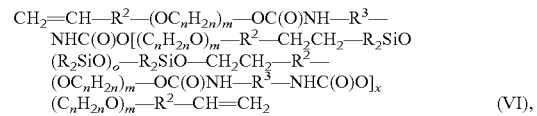

$CH_2=CH—R^2—(OC_nH_{2n})_m—OC(O)NH—R^3—$
$NHC(O)O[(C_nH_{2n}O)_m—R^2—CH_2CH_2—R_2SiO$
$(R_2SiO)_o—R_2SiO—CH_2CH_2—R^2—$
$(OC_nH_{2n})_m—OC(O)NH—R^3—NHC(O)O]_x$
$(C_nH_{2n}O)_m—R^2—CH=CH_2$  (VI), where R, R², R³, n, m and o are each as defined above and
x is 0 or an integer from 1 to 20, preferably 0 or an integer from 1 to 4.

The urethane groups in the hydrophilic siloxane copolymers of the present invention can act as donors and acceptors in the formation of hydrogen bonds.

The second step of the process according to the present invention, in addition to the organic compounds (5), may utilize still further compounds (7) which are reactive toward isocyanate groups. Examples of further compounds (7) are those selected from the group of formulae

R⁴-(A-C_nH_{2n})_m-A¹-H  (VII),

HO—R⁵—NR⁴—R⁵—OH  (VIII),

HO—R⁵—NR⁴₂  (IX),

HO—R⁶(NR⁴₂)₂  (X),

HO—R⁷—(NR⁴₂)₃  (XI),

(HO)₂R⁶—NR⁴₂  (XII),

HNR⁴₂  (XIII)

where R⁴ is a hydrogen atom or an R radical which may optionally contain one or more nitrogen atom, R⁵ is a bivalent hydrocarbyl radical having 1 to 10 carbon atoms per radical, R⁶ is a trivalent organic radical having 1 to 100 carbon atoms per radical, preferably a trivalent hydrocarbyl radical having 1 to 100 carbon atoms, which contains one or more oxygen atoms, R⁷ is a tetravalent organic radical having 1 to 100 carbon atoms per radical, preferably a tetravalent hydrocarbyl radical having 1 to 100 carbon atoms which contains one or more oxygen atoms, and A¹, n and m are each as defined above.

Examples of compounds of the formula (VII) are methylpolyethylene oxide, butylpolyethylene oxide, methylpolyethylene oxide/polypropylene oxide and methylpolypropylene oxide.

Examples of compounds of the formula (VIII) are N-methyldiethanolamine, N-methyldipropanolamine, dimethylaminopropyldipropanolamine, N-dodecyldiethanolamine and N-stearyldipropanolamine.

Examples of compounds of the formula (IX) are N,N-dimethylethanolamine, N,N-diethylpropanolamine, N,N-dimethylaminopropylmethylethanolamine and dimethyl-2-(2-aminoethoxy)ethanol.

Examples of compounds of the formula (X) are 1,5-bis (dimethylamino)pentan-3-ol, 1,5-bis(methylamino)pentan- 3-ol, 1,7-bis(dimethylamino)heptan-4-ol and N,N-bis(3-dimethylaminopropyl)-N-isopropanolamine.

Examples of compounds of the formula (XI) are 2,4,6-tris(dimethylaminomethyl)phenol, 1,1,1-tris(dimethylaminomethyl)methanol and 2,4,6-tris(dimethylaminomethyl)cyclohexanol.

Examples of compounds of the formula (XII) are N,N-bis(dimethylaminopropyl)-3-aminopropane-1,2-diol, N,N-bis(dimethylaminopropyl)-2-aminopropane-1,3-diol, N,N-bis(3-dimethylaminopropyl)carbaminomonoglyceride.

Examples of compounds of the formula (XIII) are dibutylamine, octylamine, benzylamine, 3-(cyclohexylamino)propylamine, 2-(diethylamino)ethylamine, dipropylenetriamine, isophoronediamine, dimethylaminopropylmethylamine, aminopropylmorpholine, N,N-bis(dimethylaminopropyl)amine, dimethylaminopropylamine.

Compounds of the formula (VIII) to (XIII) provide a way of incorporating protonatable nitrogen in the siloxane copolymer.

Compounds of the formula (VII) are used in the second step in amounts of preferably 0 to 2 mol and more preferably 0 to 1 mol of H-A$^1$ group per mole of H-A$^1$ group in compound (2).

Compounds of the formula (VIII) are used in the second step in amounts of preferably 0 to 2 mol and more preferably 0 to 1 mol of HO group per mole of H-A$^1$ group in compound (2).

Compounds of the formula (IX) are used in the second step in amounts of preferably 0 to 2 mol and more preferably 0 to 1 mol of HO group per mole of H-A$^1$ group in compound (2).

Compounds of the formula (X) are used in the second step in amounts of preferably 0 to 2 mol and more preferably 0 to 1 mol of HO group per mole of H-A$^1$ group in compound (2).

Compounds of the formula (XI) are used in the second step in amounts of preferably 0 to 2 mol and more preferably 0 to 1 mol of HO group per mole of H-A$^1$ group in compound (2).

Compounds of the formula (XII) are used in the second step in amounts of preferably 0 to 2 mol and more preferably 0 to 1 mol of HO group per mole of H-A$^1$ group in compound (2).

Compounds of the formula (XIII) are used in the second step in amounts of preferably 0 to 2 mol and more preferably 0 to 1 mol of HN group per mole of H-A$^1$ group in compound (2).

Polyisocyanate (5) is preferably used in deficiency—even in the presence of compounds (7)—to ensure that all the isocyanate groups, which represent a health hazard, will safely react. The amounts in which organic compounds (5) are used in the second step are therefore preferably in the range from 0.5 to 1.0 mol, more preferably in the range from 0.8 to 1.0 mol of isocyanate group per mole of the sum total of isocyanate-reactive functions from the sum total of intermediate (4) and compounds (7).

The second step is preferably carried out at the pressure of the ambient atmosphere, i.e., at approximately 1020 hPa (absolute), but can also be carried out at higher or lower pressures. Furthermore, the second step is preferably carried out at a temperature in the range from 40° C. to 140° C. and more preferably at a temperature in the range from 60° C. to 100° C.

To reduce the in some instances very high product viscosities, low molecular weight materials, such as alcohols or ethers, can be added if appropriate. Examples thereof are ethanol, isopropanol, n-butanol, 2-butoxyethanol, diethylene glycol monobutyl ether, tetrahydrofuran, diethylene glycol diethyl ether and dimethoxyethane, of which diethylene glycol monobutyl ether is a preferred example. Preferred quantities added in the case of very viscous products are up to 50% by weight and more preferably up to 30% by weight, based on the hydrophilic siloxane copolymers of the present invention. Such additions also have the advantage that the resultant products are easier to disperse in water than the pure siloxane copolymers.

The siloxane copolymers of the present invention are easy to disperse in water without further auxiliaries, such as emulsifiers, i.e., are self-dispersing, and produce emulsions and especially microemulsions.

The present invention accordingly provides emulsions and preferably microemulsions comprising
(A) hydrophilic siloxane copolymers according to the present invention, and
(B) water.

The emulsion's content of the hydrophilic siloxane copolymers (A) according to the present invention is preferably in the range from 20% to 60% and more preferably in the range from 30% to 50% by weight.

The present invention further provides a process for producing the emulsions, preferably microemulsions, by mixing of
(A) hydrophilic siloxane copolymers according to the present invention, with
(B) water.

Technologies for producing silicone emulsions are known. Silicone emulsions are typically produced by simply stirring the siloxane copolymers of the present invention with water and if appropriate subsequent homogenization with rotor-stator homogenizers, colloid mills or high pressure homogenizers.

EXAMPLE 1

491 g of an α,ω-dihydrogenpolydimethylsiloxane having 0.055% by weight of silicon-bonded hydrogen and a water content of 50 weight ppm are mixed with 1001 g of an allyl alcohol ethoxylate/propoxylate of the formula

having an a:b ratio=1.0, a water content of 978 weight ppm and an iodine number of 13.7 (the iodine number indicates the amount of iodine, in grams, consumed in the course of the addition onto the aliphatic unsaturation per 100 grams used of material to be investigated), and the mixture is heated to 100° C. and then has metered into it 0.28 g of a 2.7% by weight (based on elemental platinum) solution of a platinum 1,3-divinyl-1,1,3,3-tetramethyldisiloxane complex in an α,ω-divinyldimethylpolysiloxane having a viscosity of 1000 mPa·s at 25° C., a solution of Karstedt's catalyst (the preparation of which is described in U.S. Pat. No. 3,775,452). The temperature of the reaction mixture rises by about 6° C., whereupon the same amount of catalyst is metered in again. The reaction mixture then turns homogeneous. After an hour's reaction time at 100 to 110° C., a sample of the polyether-polysiloxane intermediate is cooled down and found to have a viscosity of 2220 mm$^2$/s at 25° C.

45.5 g of hexamethylene 1,6-diisocyanate (1.0 mol of isocyanate group per mole of HO group in the intermediate) are then metered in at 100° C., and urethane formation is catalyzed with 100 mg of di-n-butyltin dilaurate. After two hours at 100° C., the clear reaction product is cooled down. Its viscosity is about 100,000 mPa·s at 25° C.

40 g of the highly viscous oil are mixed with 60 g of water at 50° C. The product is readily emulsifiable and forms an opalescent microemulsion having a urethane content of 0.14 meq./g.

Comparative Experiment

Example 1 is repeated, except that for comparison purposes, a different batch of the polyether is used, this batch containing 3620 ppm of water from its method of production. In terms of the entire batch, the water content is now 2350 ppm of water instead of 636 ppm.

The reaction with hexamethylene 1,6-diisocyanate is accompanied by severe foaming. After the reaction has ended, a barely stirrable oil is obtained which, after incorporation of 1.5 times the amount of water (40% oil content), does not spontaneously form an emulsion. Prolonged application of high-shearing forces using a Turrax leads to the formation of a cloudy, inhomogeneous mixture.

EXAMPLE 2

960 g of the α,ω-dihydrogenpolydimethylsiloxane having a water content of 50 weight ppm from Example 1 are mixed with 536 g of a polyether of the formula

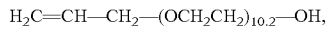
$H_2C=CH-CH_2-(OCH_2CH_2)_{10.2}-OH$, having a water content of 686 weight ppm, and heated to 100° C. 0.28 g of Karstedt's catalyst solution described in Example 1 is then added, whereupon the temperature of the reaction mixture rises to 19° C. and a clear product is formed. Complete conversion of the silicon-bonded hydrogen is achieved after one hour at 100 to 110° C. The polyether-polysiloxane intermediate has a viscosity of 760 mm²/s at 25° C.

63 g of N-methyldiethanolamine (1.02 mol of HO group per mole of HO group in the polyether) and 178 g of hexamethylene diisocyanate (0.99 mol of isocyanate group per mole of the sum total of HO groups in the intermediate and the N-methyldiethanolamine) are then meteringly added in succession. Urethane formation is catalyzed with 100 mg of di-n-butyltin dilaurate. After the batch has been held at 100° C. for 2 hours it is cooled down and 64 g of acetic acid are added at 70° C. The clear, brownish product has a viscosity of 120 000 mPa·s at 25° C.

40 g of the highly viscous oil are mixed with 60 g of water at 50° C. Gentle stirring produces a microemulsion having a urethane content of 0.39 meq./g and an amine number of 0.12 (the amine number is the number of ml of 1N HCl needed to neutralize 1 g of substance).

EXAMPLE 3

1411 g of the allyl alcohol ethoxylate/propoxylate of Example 1 are mixed with 813 g of an α,ω-dihydrogenpolydimethylsiloxane having 0.052% by weight of silicon-bonded hydrogen and heated to 100° C. with thorough stirring. Identical catalysis provides a polyether-polysiloxane intermediate having a viscosity of 2490 mm²/s at 25° C. after a reaction time of one hour.

At 100° C., 83 g of N,N-bis(3-dimethylaminopropyl)-N-isopropanolamine are stirred in and 92 g of hexamethylene diisocyanate are metered in. The ratio of NCO groups to the sum total of NCO-reactive organic groups is 0.995 or, taking into account the water present therein, just 0.87. A somewhat exothermic reaction is followed by heating to 120° C., at which point 50 mg of dibutyltin laurate are added and the reaction is allowed to proceed for a further 3 hours until isocyanate is no longer detectable in the IR, while the viscosity increases at the same time. The oil, which is very viscous at 25° C., has a basic nitrogen content of 0.42 meq./g.

EXAMPLE 4

635 g of the α,ω-dihydropolydimethylsiloxane of Example 3 are reacted with 205 g of a polyether of the formula

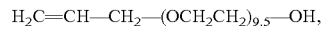
$H_2C=CH-CH_2-(OCH_2CH_2)_{9.5}-OH$, as in Example 2. The polyether-polysiloxane intermediate has an OH concentration of 0.512 meq./g and contains 177 ppm of water.

200 g of this intermediate are mixed with 10.3 g of bis(dimethylaminopropyl)amine and heated to 84° C.; 13.2 g of hexamethylene diisocyanate are metered in.

The ratio of NCO groups to the sum total of NCO-reactive organic functions is 0.998 or, if water is included, 0.97.

Complete conversion of the isocyanate groups is achieved in one hour at about 90° C. in a slightly exothermic reaction without further catalysis. The polymer mixture contains 0.49 meq. of basic nitrogen per gram.

32 g of this polymer are neutralized with a solution of 1.04 g of acetic acid in 8 g of diethylene glycol monobutyl ether. A slightly yellowish microemulsion forms spontaneously with 60 g of water after stirring with a spatula.

EXAMPLE 5

200 g of the polyether-polysiloxane intermediate prepared in Example 4 (0.512 meq. of OH/g) are admixed with an additional 26.2 g of the polyether used in the synthesis of the intermediate and also with 14.8 g of bis(dimethylaminopropyl)amine and heated to 80° C. The addition of 19.8 g of hexamethylene diisocyanate immediately starts a moderately exothermic reaction, which ends after about 2 hours at 90° C., and isocyanate is no longer detectable. The ratio of NCO to the sum total of NCO-reactive groups (OH, NH) is 0.995 when water is not included and only 0.97 when the water present therein is included.

The highly viscous polymer mixture has a basic nitrogen concentration of 0.60 meq./g.

A microemulsion is produced by neutralizing 32 g of this product with a solution of 1.29 g of acetic acid in 8 g of diethylene glycol monobutyl ether and then adding 60 g of water with stirring.

EXAMPLE 6

200 g of the polyether-polysiloxane intermediate prepared in Example 4 (0.512 meq. of OH/g) and just 4.5 g of bis(dimethylaminopropyl)amine are heated to 88° C. without further additions of polyether. The addition of 10.6 g of hexamethylene diisocyanate starts a slightly exothermic reaction. The ratio of NCO groups to the sum total of NCO-reactive organic functions is 0.998 or, having regard to the water present in the reaction mixture, 0.97.

Isocyanate is no longer detectable after 1 hour at 100° C. The highly viscous polymer has a basic nitrogen content of 0.22 meq./g.

A stable microemulsion is obtained by neutralizing 32 g of basic product with a solution of 0.46 g of acetic acid in 8 g of diethylene glycol monobutyl ether and adding 60 g of water with stirring.

The invention claimed is:

1. A hydrophilic siloxane copolymer prepared by:

reacting, in a first step, organopolysiloxane(s) (1) which have at least one silicon-bonded hydrogen atom per molecule, with at least one substantially linear oligomeric or polymeric compound (2) of the formula $$R^1\text{-}(A\text{-}C_nH_{2n})_m\text{-}A^1\text{-}H \tag{I}$$

where $R^1$ is a monovalent optionally substituted hydrocarbyl radical capable of adding Si—H groups in a hydrosilylation reaction, A is a bivalent polar organic radical selected from the group consisting of —O—, —C(O)—O—, —O—C(O)—, —O—C(O)—O—, —C(O)—NH—, —NH—C(O)—, urethane radicals and urea radicals, $A^1$ is a bivalent polar organic radical selected from the group consisting of —O—, —NH— and —NR'—, where R' is a monovalent hydrocarbyl radical of 1 to 18 carbon atoms, n is an integer from 1 to 20, and m is a positive integer; and reacting, in a second step, the resulting H-$A^1$-containing intermediate(s) (4) obtained in the first step, with organic compounds (5) which have two or more isocyanate groups per molecule, with the proviso that the water content of the compounds (1) and (2) is lower than 2000 weight ppm based on the total weight of compounds (1) and (2), and wherein the organic compounds (5) having two or more isocyanate groups per molecule are used in amounts of 0.5 to 1.0 mol of isocyanate groups per mol of H-$A^1$ group in the intermediate(4).

2. The hydrophilic siloxane copolymer of claim 1, wherein organopolysiloxane(s) (1) have the formula $$H_gR_{3-g}SiO(SiR_2O)_o(SiRHO)_pSiR_{3-g}H_g \tag{III}$$

where each R independently is a monovalent optionally substituted hydrocarbyl radical having 1 to 18 carbon atoms per radical, g is 0, 1 or 2, o is 0 or an integer from 1 to 1500, and p is 0 or an integer from 1 to 200, with the proviso that there is at least one silicon-bonded hydrogen atom per molecule.

3. The hydrophilic siloxane copolymer of claim 2, wherein organopolysiloxane(s) (1) are α,ω-dihydrogendiorganopolysiloxanes.

4. The hydrophilic siloxane copolymer of claim 1, wherein A and $A^1$ in formula (I) are an oxygen atom —O—.

5. The hydrophilic siloxane copolymer of claim 1, wherein compound (2) is a polyether of the formula $$H_2C=CH—R^2—(OC_nH_{2n})_m—OH \tag{IV}$$

where $R^2$ is a bivalent hydrocarbyl radical of 1 to 10 carbon atoms.

6. The hydrophilic siloxane copolymer of claim 1, wherein compound (5) is a diisocyanate of the formula $$O=C=N—R^3—N=C=O \tag{V}$$

where $R^3$ is a bivalent hydrocarbyl radical having 4 to 40 carbon atoms per radical.

7. The hydrophilic siloxane copolymer of claim 1, wherein the second step utilizes at least one further compound (7) whose formula is selected from the group consisting of $$R^4\text{-}(A\text{-}C_nH_{2n})_m\text{-}A^1\text{-}H \tag{VII},$$

$$HO—R^5—NR^4—R^5—OH \tag{VIII}$$

$$HO—R^5—NR^4_2 \tag{IX},$$

$$HO—R^6(NR^4_2)_2 \tag{X},$$

$$HO—R^7—(NR^4_2)_3 \tag{XI},$$

$$(HO)_2R^6—NR^4_2 \tag{XII) and}$$

$$HNR^4_2 \tag{XIII}$$

where $R^4$ is a hydrogen atom or an R radical optionally containing a nitrogen atom, $R^5$ is a bivalent hydrocarbyl radical of 1 to 10 carbon atoms per radical, $R^6$ is a trivalent organic radical having 1 to 100 carbon atoms per radical optionally containing one or more oxygen atoms, and $R^7$ is a tetravalent organic radical having 1 to 100 carbon atoms per radical and optionally containing one or more oxygen atoms.

8. The hydrophilic siloxane copolymer of claim 1, having the formula $$CH_2=CH—R^3—(OC_nH_{2n})_m—OC(O)NH—R^2—NHC(O)O[(C_nH_{2n}O)_m—R^3—CH_2CH_2—R_2SiO(R_2SiO)_o—R_2SiO—CH_2CH_2—R^3—(OC_nH_{2n})_m—OC(O)NH—R^2—NHC(O)O]_x(C_nH_{2n}O)_m—R^3—CH=CH_2 \tag{VI}$$

where each R independently is a monovalent optionally substituted hydrocarbyl radical having 1 to 18 carbon atoms per radical, $R^2$ is a bivalent hydrocarbyl radical having 1 to 10 carbon atoms, $R^3$ is a bivalent hydrocarbyl radical having 4 to 40 carbon atoms per radical, n is an integer from 1 to 20, m is a positive integer, o is 0 or an integer from 1 to 1500, and x is 0 or an integer from 1 to 20.

9. A process for preparing a hydrophilic siloxane copolymer of claim 1, comprising reacting, in a first step, organopolysiloxane(s) (1) which have at least one silicon-bonded hydrogen atom per molecule, with at least one substantially linear oligomeric or polymeric compound(s) (2) of the general formula $$R^1\text{-}(A\text{-}C_nH_{2n})_m\text{-}A^1\text{-}H \tag{I}$$

where $R^1$ is a monovalent optionally substituted hydrocarbyl radical capable of adding Si—H groups in a hydrosilylation reaction, A is a bivalent polar organic radical selected from the group consisting of —O—, —C(O)—O—, —O—C(O)—, —O—C(O)—O—, —C(O)—NH—, —NH—C(O)—, urethane radical and urea radical, $A^1$ is a bivalent polar organic radical selected from the group consisting of —O—, —NH— and —NR—, where R is a monovalent hydrocarbyl radical of 1 to 18 carbon atoms, n is an integer from 1 to 20, and m is a positive integer; and reacting, in a second step, the H-$A^1$-containing intermediate(s) (4) of the first step, with organic compounds (5) which have two or more isocyanate groups per molecule, with the proviso that the water content of the compounds (1) and (2) is lower than 2000 weight ppm, based on the total weight of compounds (1) and (2) and wherein the organic compounds (5) having two or more isocyanate groups per molecule are used in amounts of 0.5 to 1.0 mol of isocyanate groups per mol of isocyanate-reactive groups.

10. The process of claim 9, wherein the organic compounds (5) which have two or more isocyanate groups per molecule, are used in amounts of 0.5 to 1.0 mol of isocyanate group per mole of H-A$^1$ group in the intermediate (4).

11. An aqueous emulsion comprising:
(A) at least one hydrophilic siloxane copolymer of claim 1, and
(B) water.

12. A process for producing an aqueous emulsion, comprising mixing
(A) at least one hydrophilic siloxane copolymer of claim 1, with
(B) water.

13. The process of claim 12 wherein no emulsifier is employed.

14. A hydrophilic siloxane copolymer of the formula

CH$_2$=CH—R$^3$—(OC$_n$H$_{2n}$)$_m$—OC(O)NH—R$^2$—NHC(O)O[(C$_n$H$_{2n}$O)$_m$—R$^3$—CH$_2$CH$_2$—R$_2$SiO (R$_2$SiO)$_o$—R$_2$SiO—CH$_2$CH$_2$—R$^3$—(OC$_n$H$_{2n}$)$_m$—OC(O)NH—R$^2$—NHC(O)O]$_x$ (C$_n$H$_{2n}$O)$_m$—R$^3$—CH=CH$_2$ (VI), where each R independently is a monovalent optionally substituted hydrocarbyl radical having 1 to 18 carbon atoms per radical,
R$^2$ is a bivalent hydrocarbyl radical having 1 to 10 carbon atoms,
R$^3$ is a bivalent hydrocarbyl radical having 4 to 40 carbon atoms per radical,
n is an integer from 1 to 20,
m is a positive integer,
o is 0 or an integer from 1 to 1500, and
x is 0 or an integer from 1 to 20.

15. A hydrophilic siloxane copolymer prepared by:
reacting, in a first step,
organopolysiloxane(s) (1) which have at least one silicon-bonded hydrogen atom per molecule, with at least one substantially linear oligomeric or polymeric compound (2) of the formula R$^1$-(A-C$_n$H$_{2n}$)$_m$-A$^1$-H (I)

where R$^1$ is a monovalent optionally substituted hydrocarbyl radical capable of adding Si—H groups in a hydrosilylation reaction, A is a bivalent polar organic radical selected from the group consisting of —O—, —C(O)—O—, —O—C(O)—, —O—C(O)—O—, —C(O)—NH—, —NH—C(O)—, urethane radicals and urea radicals,
A$^1$ is a bivalent polar organic radical selected from the group consisting of —O—, —NH— and —NR'—,
where R' is a monovalent hydrocarbyl radical of 1 to 18 carbon atoms,
n is an integer from 1 to 20, and
m is a positive integer; and
reacting, in a second step,
the resulting H-A$^1$-containing intermediate(s) (4) obtained in the first step, with organic compounds (5) which have two or more isocyanate groups per molecule, and with at least one compound (7) selected from the group consisting of R$^4$-(A-C$_n$H$_{2n}$)$_m$-A$^1$-H (VII),

HO—R$^5$—NR$^4$—R$^5$—OH (VIII),

HO—R$^5$—NR$^4{}_2$ (IX),

HO—R$^6$(NR$^4{}_2$)$_2$ (X),

HO—R$^7$—(NR$^4{}_2$)$_3$ (XI), (HO)$_2$R$^6$—NR$^4{}_2$ (XII) and

HNR$^4{}_2$ (XIII)

where R$^4$ is a hydrogen atom or an R radical optionally containing a nitrogen atom,
R$^5$ is a bivalent hydrocarbyl radical of 1 to 10 carbon atoms per radical,
R$^6$ is a trivalent organic radical having 1 to 100 carbon atoms per radical optionally containing one or more oxygen atoms, and
R$^7$ is a tetravalent organic radical having 1 to 100 carbon atoms per radical and optionally containing one or more oxygen atoms,
with the proviso that the water content of the compounds (1) and (2) is lower than 636 ppm or less based on the total weight of compounds (1) and (2), wherein the reactants used in preparing said hydrophilic siloxane copolymer consist essentially of organopolysiloxanes (1), compound (2), organic compounds having at least two isocyanate groups (5), and compound(s) 7.

* * * * *

UNITED STATES PATENT AND TRADEMARK OFFICE
CERTIFICATE OF CORRECTION

PATENT NO. : 7,319,120 B2 Page 1 of 1
APPLICATION NO. : 10/539331
DATED : January 15, 2008
INVENTOR(S) : Christian Herzig et al.

It is certified that error appears in the above-identified patent and that said Letters Patent is hereby corrected as shown below:

Column 12, Line 59, Claim 9:

Delete "-NR-, where R" and insert:

--NR'-, where R'--.

Signed and Sealed this

Twenty-seventh Day of May, 2008

JON W. DUDAS
*Director of the United States Patent and Trademark Office*